June 25, 1963 R. G. THOMPSON 3,095,005
FLOAT VALVE MECHANISM
Filed Dec. 8, 1960
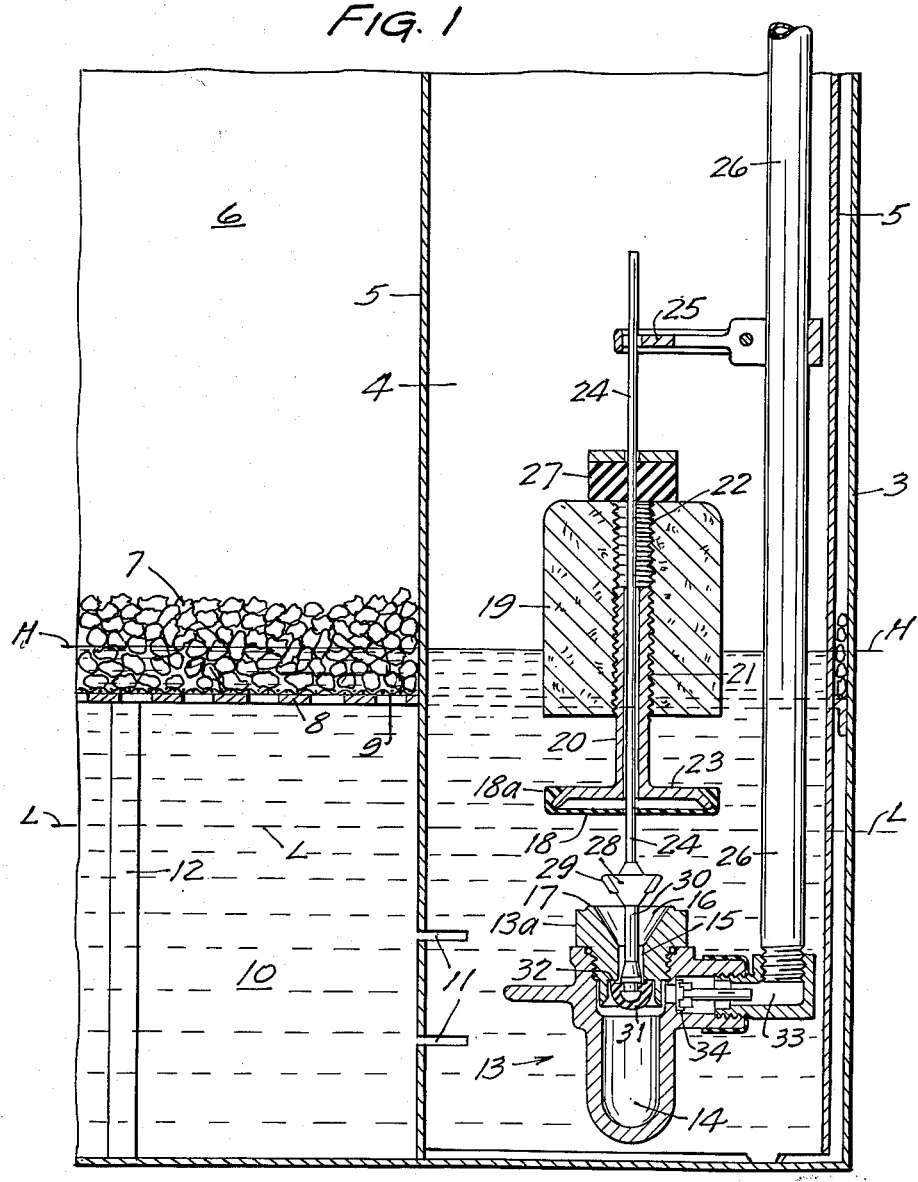
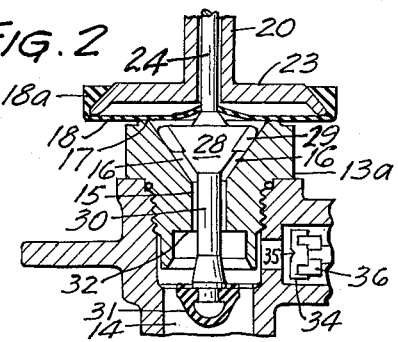
INVENTOR
RICHARD G. THOMPSON
BY John E. Stryber
ATTORNEY

United States Patent Office 3,095,005
Patented June 25, 1963

3,095,005
FLOAT VALVE MECHANISM
Richard G. Thompson, Stillwater, Minn., assignor to Union Tank Car Company, Chicago, Ill., a corporation of New Jersey
Filed Dec. 8, 1960, Ser. No. 74,600
4 Claims. (Cl. 137—268)

This invention relates to a float actuated valve which is particularly adapted for use in water treatment systems wherein a body of solid regenerating material, for example pellets or coarse granules of salt, is supported directly on a foraminous platform or false bottom extending horizontally above a liquid regenerant compartment. In water treatment apparatus of this type a measured quantity of liquid regenerant is withdrawn from the liquid compartment for each regenerating cycle and the liquid is replaced by an equal volume of make-up water following each withdrawal. An important characteristic of these "brine platform systems," as they are called in the industry, is the limitation of the penetration of liquid into the overlying body of solid regenerant to a fixed relatively low level, usually not exceeding one inch in domestic water treatment apparatus. Since the compartment below the platform contains only liquid regenerant, efficient use is made of the entire capacity of the regenerant tank and a maximum quantity of solid regenerant may be provided for use over long periods of time, without replenishment or service of any kind.

For convenience of reference, all solutions or liquid regenerants are herein referred to as "brine" and this term is not limited to solutions of common salt which are used in many water softeners as the regenerating liquid.

In regenerating systems of the type having a tank containing a body of solid regenerant supported on a bed of gravel or other inert aggregate, it is necessary to penetrate the solid regenerant with liquid to a much higher level than in the platform system for each cycle of operation. This increase in penetration may be on the order of ten times the penetration in a tank of the same capacity utilizing the platform system. The reason for the greater rise above the gravel bed is that the latter has a capacity for brine equal to approximately 40% of the body of gravel, the 40% representing the volume of the voids between the inert aggregate particles.

One of the difficulties encountered in the use of regenerant tanks wherein the solid regenerant is supported on a bed of gravel is caused by the bridging or caking of the solid regenerant above the high liquid level as a result of the wetting of a relatively large body of the solid regenerant during each make-up cycle. When this bridging condition occurs the solids do not settle into the liquid and there is a progressive reduction in the concentration of the brine solution until no brine is formed from the make-up water. Extensive tests have shown that difficulties of this kind are substantially eliminated by the use of the brine platform system. Other advantages of the platform system are the elimination of the need for shipping heavy bodies of gravel, the elimination of the need for thoroughly cleaning the gravel for use in the regenerant tanks and elimination of the contaminating effect of the gravel. It will also be evident that the brine platform system utilizes the entire capacity of the regenerant tank to contain the solid and liquid regenerant, thereby making it feasible to utilize smaller regenerant tanks for installations of any required size.

Heretofore the advantages of the brine platform system have been offset substantially by the fact that the float valves for measuring the quantity of regenerant withdrawn in each cycle have not been readily adjustable to provide selected amounts of make-up water and brine for installations for treating water containing varying amounts of impurities or hardening substances. Ordinary float valves are not efficient in brine platform systems for the reason that such valves are adjustable only to change the upper liquid level, whereas the advantages of the platform system are derived by maintaining a fixed upper level above the foraminous platform supporting the solid regenerant.

By the present invention I obviate the foregoing disadvantages of the platform system by providing a float actuated valve having a float which may be readily set to insure a predetermined maximum rise of liquid in the body of solid regenerant, and at the same time, provide for a ready adjustment of the quantity of brine drawn in each cycle of operation to meet the needs for treatment of various waters.

Accordingly, it is the principal object of the present inevntion to provide a float actuated valve having a float which may be set to interrupt the flow of make-up water into the regenerant tank when the level of the liquid reaches a predetermined fixed maximum elevation above the platform supporting the solid regenerant and having a valve closure member carried by the float and adjustably connected thereto whereby the quantity of brine withdrawn during each regenerating cycle may be adjusted to terminate the withdrawal of brine when selected quantities have been withdrawn for each regenerating cycle.

The invention also includes certain details of construction which will be more fully pointed out in the following specification and claims.

Referring to the drawing which illustrates a preferred embodiment of my invention, by way of example and not for the purpose of limitation;

FIGURE 1 is a central vertical sectional view through one of my improved valves mounted in a regenerant tank wherein a solid regenerant is directly supported on a platform above a brine compartment, the valve being shown in its position for cutting off the flow of make-up water to the tank when the brine has reached a predetermined high level above the platform, and FIG. 2 is a fragmentary vertical sectional view of the valve showing its closure members in position to cut-off the flow of brine from the brine tank when the selected low level is reached therein.

In the drawing, a fragmentary portion of a regenerant tank is indicated generally by the numeral 3. Near one side of this tank a float chamber 4 is shown separated by a wall 5 from a main compartment 6 for solid regenerating material. The wall 5 may be of cylindrical form so that the float chamber 4 is contained within the tank 3. A large body of solid regenerant, indicated at 7, is contained in the tank 3 exteriorly of the float chamber 4 and is supported on a foraminous platform or false bottom 8 of sufficient strength and rigidity to support a large body of solid regenerant. The false bottom 8 is preferably provided with a fine screen 9 on its upper surface to exclude solid particles of regenerant from a brine chamber 10 in the lower portion of the tank 3. Communication between the brine chamber 10 and float chamber 4 is provided through a plurality of slots 11 formed in the wall 5. The false bottom 8 may be supported at its periphery on the walls of the tank 3 and intermediate supports 12 rising from the bottom of the tank 3 may also be provided.

As shown, the valve has a casing indicated generally by the numeral 13 defining a chamber 14 from which a first passage 15 extends upwardly to communicate with the interior of the float chamber 4. An upwardly and outwardly flaring, generally conical upper end portion 16 of the passage 15 is formed in a casing member 13a having a threaded connection with the main valve body, this connection having an O ring seal. An annular valve seat 17, hereinafter referred to as a first valve seat, is formed on the upper face of the member 13a for sealing contact with a first valve closure member 18 carried by a float body 19 in the chamber 4. The connection between the float body 19 and closure member 18 comprises an elongated stem 20 having a threaded upper end portion 21 adjustably fitting in an axial bore 22 formed in the float body. The closure member 18 preferably comprises a flexible diaphragm of elastic material adapted to make sealing contact with the annular seat 17, and having a peripheral flange 18a mounted on a circular support 23 which is integral with the stem 20. The support 23 has a peripheral downwardly projecting flange which is connected to the flange 18a for retaining the flexible portion of the member 18 in spaced relation to the lower face of the support 23.

A float guide rod 24 extends axially through an axial bore in the stem 20 and projects from the upper end of the float body for sliding engagement with a bearing in a guide bracket 25. The latter may be secured to a conduit 26 which is connected at its lower end to the valve casing 13 and adapted to alternately supply make-up water to the chamber 14 and withdraw brine therefrom.

Mounted on the guide rod 24 and normally retained in fixed position thereon by frictional engagement therewith is an upper stop 27 for the float body 19. This stop may be constructed in whole or in part from resilient rubber-like material having an axial bore which fits snugly about the rod 24.

A head 28 is fixed on the lower end of the rod 24 in coaxial relation thereto and is adapted to fit in the recess 16. Projections 29 are formed on the head 28 for centering it in the recess 16 and for affording a flow passage at the periphery of the head 28 when the latter is in retracted position within the recess 16. A second valve stem 30 extends downwardly from the head 28 in coaxial relation thereto and is fitted at its lower end with a second valve closure member 31 in the chamber 14. This closure member 31 is movable to and from an annular seat 32 surrounding the lower end of the passage 15 and is adapted to close this passage at its lower end when the float body 19 is in its high level position shown in FIG. 1.

Extending laterally from the upper portion of the chamber 14 is a second passage 33 which is in continuous communication with the conduit 26. A flow check member 34 of generally cylindrical shape fits loosely in the passage 33 and is formed with a cross slot 35 at one end to restrict the flow into the chamber 14 during the period for refill or pressure flow to the float chamber 4. The opposite end surface of the check member 34 has a pair of larger cross slots 36 which allow more rapid flow out from the chamber 14 to the conduit 26. During refill operation the check member 34 is in the position indicated in FIG. 1 and during withdrawal of liquid through the conduit 26 this check member is in a retracted position to the right of the position shown in FIG. 1.

In operation, make-up water may be fed to the chamber 14 at a pressure above atmospheric pressure and, subsequently, brine may be withdrawn under subatomspheric pressure through the conduit 26. When the float body 19 is in its low level position wherein the closure member 18 is closed in sealing relation to its seat 17, as shown in FIG. 2, the level of liquid in the float chamber and regenerant chamber 6 is normally at a level slightly below the false bottom 8, as indicated by the broken line L in FIG. 1. During the refill cycle water under superatmospheric pressure is fed through the conduit 26 and passage 33 to chamber 14 and passes upwardly therefrom past the seat 32 through the passage 15 and past the head 28. The pressure of fluid on the closure member 18 raises this member from its seat 17 so that brine gradually fills the float chamber.

This refill flow continues while the float body 19 engages the upper stop 27 and then actuates the rod 24 connected to the stop 27 and stem 30 to move the second closure member 31 to its closed position at its seat 32. Complete closure of the valve at the seat 32 occurs when a quantity of make-up water sufficient to raise the level in the float chamber 4 to a predetermined high level, such as that indicated at H in FIG. 1, has been reached. Thus the liquid is caused to rise in the solid regenerant chamber 6 to a fixed elevation slightly above the false bottom 8 as determined by the position of the upper stop 27 on the rod 24.

When the valve and float are in the position shown in FIG. 1, withdrawal of brine from the float chamber 4 and brine chamber 10 starts when suitable subatmospheric pressure is created in the conduit 26 to draw brine from the valve chamber 14. This causes the closure member 31 to be drawn downwardly from its seat 32, opening passage 15 for flow at a controlled rate from chamber 14, and out through the passage 33 and conduit 26. Shortly after the withdrawal starts, the head 28 is seated in the conical recess 16, thus stopping downward movement of the rod 24 carrying the stop 27, and retaining closure member 31 in open position in the chamber 14. Thereafter, as the withdrawal continues the float body 19 slides down the guide rod 24 until the closure member 18 reaches a low level position in which it closes at the seat 17 and stops the withdrawal of brine from the tank 3.

By turning the threaded stem 20 either upwardly or downwardly in relation to the float body 19 the spacing of the closure member 18 relative to float body 19 may be changed to selectively adjust the quantity of brine which is withdrawn during each regeneration cycle. The quantity of brine drawn for each cycle is inversely proportional to the spacing of member 18 from the bottom of the float body 19. The projecting portion of the stem 20 may be marked and calibrated to indicate the quantity of brine or salt that will be drawn when the member 18 is in any of the adjusted positions.

It will thus be evident that by the present invention, the advantageous features of the brine platform system are extended to provide for quick and easy adjustment of the quantities of liquid regenerant which are utilized in each cycle of automatic or semi-automatic operation and best suited for the water or other liquid to be treated.

I claim:

1. In a water treatment system, a tank containing a body of solid regenerating material supported on a foraminous false bottom, a liquid underflow compartment extending beneath said false bottom, a float chamber in continuous communication with said underflow compartment, float valve mechanism in said float chamber, having a casing normally submerged in liquid therein and defining a valve chamber, a first passage extending upwardly from said valve chamber to said float chamber, a second passage for alternately supplying liquid to said valve chamber and withdrawing brine therefrom, upper and lower valve seats surrounding the upper and lower ends respectively of said first passage, a lower valve closure member movable in said valve chamber to close said first passage at said lower seat against the ingress of liquid into said float chamber, a float body connected to said lower valve closure member for actuating it to and from said lower valve seat in response to changes in the elevation of liquid in said float chamber, a first elongated valve stem extending downwardly from said float body in axial alignment with said first passage and upper valve seat, an upper valve closure member carried by said stem in downwardly spaced relation to said float body and disposed to close said first passage at said upper seat against the egress of liquid from said float chamber, means for securing said upper valve closure member in variously spaced relation to said float body, and an upper level stop for said float body disposed at a predetermined elevation above said false bottom, whereby said lower valve closure member may be actuated to close said first passage when the float body rises to an upper level position determined by the elevation of said upper level stop, the spacing of said first valve closure member from said float body being determinative of the quantity of brine effluent when the float body descends to selected low levels, independently of the high level position of said stop.

2. Float valve mechanism in accordance with claim 1 in which said means for securing said upper valve closure member in variously spaced relation to said float body comprises a screw threaded portion of said first elongated valve stem engaging a threaded bore formed in said float body in axial alignment with said first passage, whereby the spacing of said upper valve closure member downwardly from said float body may be adjusted by turning said first elongated valve stem in said bore.

3. Float valve mechanism in accordance with claim 1 in which said upper valve closure member includes a flexible diaphragm for contact with said upper valve seat and a circular support for said diaphragm fixed on the lower end of said upper valve stem.

4. In a water treatment system, a tank containing a body of solid regenerating material supported on a foraminous false bottom, a liquid underflow compartment extending beneath said false bottom, a float chamber in continuous communication with said underflow compartment, float valve mechanism in said float chamber having a casing normally submerged in liquid therein and defining a valve chamber, a first passage extending upwardly from said valve chamber to said float chamber, a second passage for alternately supplying liquid to said valve chamber and withdrawing brine therefrom, upper and lower valve seats surrounding the upper and lower ends respectively of said first passage, a lower valve closure member movable in said valve chamber to close said first passage at said lower seat against the ingress of liquid into said float chamber, a float guide extending upwardly from said lower valve closure member in coaxial relation thereto, a float body movable along said guide in response to changes in the elevation of liquid in said float chamber, a first elongated valve stem extending downwardly from said float body, an upper valve closure member carried by said stem in downwardly spaced relation to said float body and disposed to close said first passage at said upper seat against the egress of liquid from said float chamber, means for securing said upper valve closure member in variously spaced relation to said float body, a second valve stem connecting said lower valve closure member to said float guide and extending through said first passage; and an upper level stop for said float body secured to said guide at a predetermined elevation above said false bottom, whereby said lower valve closure member may be actuated to close said first passage when the float body rises to an upper level position determined by the elevation of said upper stop, the downward spacing of said upper valve closure member from said float body being determinative of the quantity of brine effluent when the float body descends to selected low levels, independently of the high level position of said stop.

References Cited in the file of this patent
UNITED STATES PATENTS

| | | |
|---|---|---|
| 484,560 | Rhodes | Oct. 18, 1892 |
| 2,820,419 | Albertson | Jan. 21, 1958 |
| 2,904,062 | Techler | Sept. 15, 1959 |